Patented Sept. 30, 1941

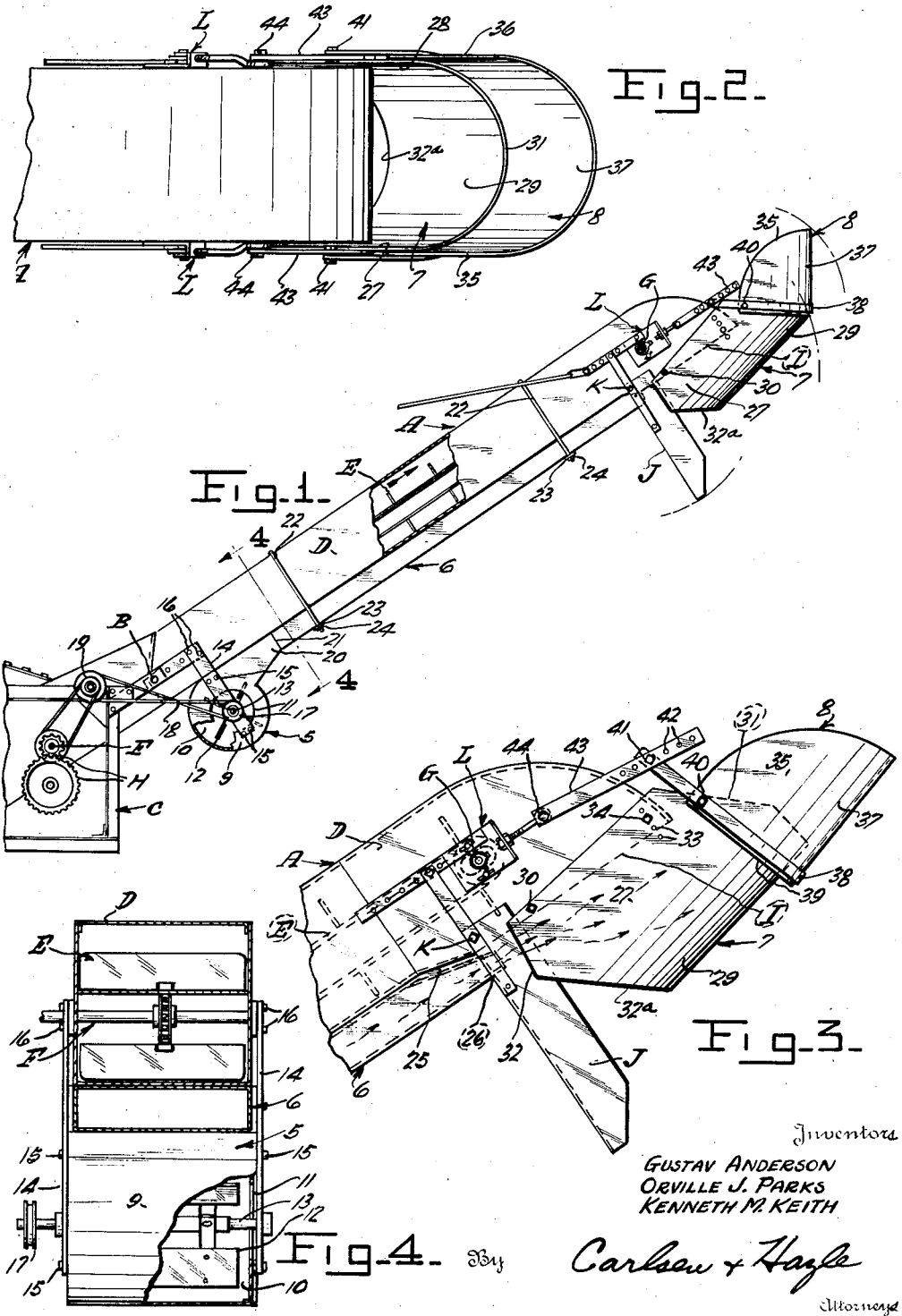

2,257,097

UNITED STATES PATENT OFFICE 2,257,097

CROP CLEANING ATTACHMENT FOR HARVESTER CONVEYERS

Gustav Anderson, St. Louis Park, Orville J. Parks, Hopkins, and Kenneth M. Keith, Minneapolis, Minn., assignors to Minneapolis-Moline Power Implement Company, Minneapolis, Minn., a corporation of Delaware Application April 6, 1939, Serial No. 266,434

10 Claims. (Cl. 209—136)

This invention relates to improvements in elevators and conveyers for harvesting implements.

The invention has particular reference to improvements in cleaning apparatus for use in connection with corn harvesters or huskers of the type used to snap the ears of corn from the stalks, clean the corn of the husks, and finally deliver the cleaned corn to a wagon or receptacle which operates alongside the implement during its travel over the field. In actual practice it is found that, due to varying crop conditions encountered, and to other factors, there will usually be some of the husks and fragments thereof remaining in the corn and which will tend to be elevated and conveyed therewith to the wagon.

The present invention aims as its primary object to improve the husked corn elevator or conveyer by the addition thereto of a blower and air duct in such manner that a blast of air will be directed through and against the stream of corn as it is discharged to the wagon, to thus blow out all the lighter matter such as husks and husk fragments and cause them to be blown back to the field so that the corn entering the wagon will be thoroughly cleaned.

A further object is to provide in a blower and air duct assembly of this kind means for supporting the same entirely from the associated corn elevator and with suitable driving connection with operating parts of the implement, all to the end that the attached air handling parts may move along with the elevator as the same is folded and adjusted in the usual manipulation of the machine, and without interfering in any way with these normal adjustments.

Still a further object is to provide a means including deflector elements or hoods, arranged for interdependent adjustments, to vary the angle of discharge of the air blown husks, to thus best adjust the discharge according to the prevailing wind direction and velocity and prevent the husks and discharged matter from being blown into the wagon and remixed with the cleaned corn. These elements further act to prevent loose or shelled corn, which to some extent will be present in the cleaned corn, from being blown clear by the air blast and to direct this corn also into the wagon.

These and other more detailed and specific objects will be disclosed in the course of the following specification, reference being had to the accompanying drawing, in which—

Fig. 1 is a frontal elevation of the laterally and upwardly projecting corn elevator as employed on a conventional corn harvester (shown only fragmentally) showing our invention applied thereto.

Fig. 2 is an enlarged plan view of the delivery end of the corn elevator and the deflecting elements of our invention.

Fig. 3 is an enlarged fragmentary elevational view of the delivery end of the elevator, showing the air duct and the deflecting elements, the latter being adjusted to different positions relative to the showing in Fig. 1.

Fig. 4 is an enlarged cross section along the line 4—4 in Fig. 1.

Referring now with more particularity and by reference characters to the drawing, A designates the corn elevator or delivery member which is pivotally supported at B upon the harvester frame C, and which, while in use, inclines laterally as shown, but which may be folded inwardly and upwardly, on the point B, to narrow the implement for transport purposes. The elevator comprises an elongated housing D of quadrilateral cross section in which is mounted a conventional chain type conveyer E between the sprocket shafts or centers F and G, the lower or inner sprocket being conventionally driven by gears H or other suitable means to cause the upper stretch or reach of the conveyer to travel upwardly as indicated. The corn is deposited, after husking, upon the lower end of the conveyer E and is carried thereby upwardly through the housing D and is finally discharged through an opening I in the outer and lower side thereof. The corn then falls through said opening upon a chute J which directs it into the wagon or other receptacle (not shown) below. This chute J is pivotally supported at K and may be adjusted to discharge the corn in various positions in the wagon for even filling thereof, these adjustments being made by the operator by remote control means or cables (not shown) of conventional arrangement.

Our invention comprises essentially an air blower or fan assembly designated generally at 5, an air duct or tube 6 and the deflector elements 7 and 8, all of which are supported from the elevator A at the underside thereof in such manner that they move with the elevator as it is adjusted or folded and without in any way interfering with such movements.

The blower 5 is located at the lower side of the elevator near its inner end, and comprises a housing 9 of substantially the usual form defining an interior fan chamber 10 into which air may enter from each end through openings 11. A fan 12 is journaled within this housing by its axle 13 which is supported in bearings at each end in supporting bars 14 which are bolted at 15 across the ends of the fan housing and are secured at their upper ends at 16 to the sides of the elevator housing D to act as hangers and supports for the blower. One end of the fan axle 13 carries a pulley 17 and a belt 18 connects same to another pulley 19 provided on the implement C and driven by some working part thereof in such manner that the fan will be rapidly rotated as the machine operates and will draw in air through the openings 11 and discharge the air at high velocity through the rectangular discharge neck 20 of the housing 9.

The duct 6 is formed of sheet metal to a rectangular cross section having a width substantially equal to that of the elevator housing D, and of such size that it may be coupled at 21 to the discharge neck 20 of the blower 5. This duct is extended along the lower side of the elevator housing in contact therewith and is retained in place by large U-bolts or yokes 22 which are set astraddle the elevator and duct and fit at their lower ends through apertured cross bars 23 placed crosswise beneath the duct. Nuts 24 are then turned up on the ends of the U-bolts 22 against the bars 23 to draw the duct upwardly against the elevator and retain the parts in position. It will be noted that this mounting assembly requires no alteration whatever in the elevator, and the hanger bars 14 and U-bolts 22 rigidly support and connect the parts.

At its upper end the duct 6 is tapered somewhat as shown at 25 to reduce the size of its discharge orifice and to fit the underside of the elevator, and this tapered end is extended through a recess 26 cut in the bottom of the trough J so that the air stream issuing from the duct will be directed across the opening I through which the corn falls from the elevator. The air moving at high velocity will thus blow all lighter matter, such as husks, husk fragments, and other foreign matter from the corn, allowing the corn to drop to the trough J in a thoroughly cleaned condition. The air blown matter will be thrown upwardly clear of the elevator's upper end and it may then fall back to the field.

This operation is entirely satisfactory under perfect conditions, but in most cases it will be found that the wind blowing in the field will have a tendency to scatter the air discharged husks or blow them toward the wagon, causing them to settle in unwanted places. Our invention therefore further includes the inner and outer deflecting elements or members 7 and 8 which will now be described. The inner member 7 comprises sides 27—28 joined by the rounded bight or outer portion 29 and the inner upper corners of the sides are pivotally attached at 30 to the sides of the elevator A slightly above and outwardly of the trough J so that the lower edges of the sides slidably overlap the trough sides and the sides 27—28 and outer portions 29 of the member form a partial enclosure around the opening I. Upper and lower ends 31—32 of the inner member 7 are open as shown, and the lower end is beveled or cut off angularly as designated at 32a, so that the corn may drop freely to the trough J. This air stream issuing from the duct 6 will blow through the relatively large chamber, channel, or partial enclosure defined by this deflector 7, and the air stream may spread and become diffused through this chamber to thoroughly cover and penetrate the corn stream from the opening I. In this connection it may be noted that shelled corn, which will as stated be present to some extent in the cleaned ear corn, may, when first struck by the air blast, be thrown upwardly somewhat, but it will not be blown completely out and will instead fall back upon the rounded portion 29 and will be guided thereby downwardly to the trough J for discharge to the wagon.

The sides 27—28 of inner deflecting member 7 are provided with a series of spaced apertures 33 disposed in an arcuate line near the upper corners of the sides for selective engagement by screws 34 extended from the elevator sides. The angle of the deflector 7 relative to the elevator A and opening I, may thus be adjusted by placing the screw 34 through any of the apertures 33. Two possible adjustments are shown in Figs. 1 and 3.

The outer deflecting member 8 is hood-shaped having the spaced sides 35—36 and rounded crown or bight portion 37 connecting these sides. The sides are rounded in their upper, inner edges as shown. The curvature and size of these parts is such that this hood may be fitted over the upper end of the inner deflecting member 7. A yoke 38 is secured around the lower straight ends 39 of the hood, and near the lower corners of the sides 35—36, bolts 40 pivotally extend through this yoke and the deflecting members 7 and 8 to thereby pivotally connect the outer hood 8 by its corners to the upper end of the inner element 7. The rounded portion 37 of the hood may thus be adjusted upwardly and downwardly in overlapping relation with the rounded upper end of the inner member 7, the bolts 40 serving as pivots for this purpose.

The ends of the yoke 38 are extended and provided with bolts 41 which may be engaged with any one of a series of apertures 42 in the bars 43 which are connected at 44 to a part of the bearing L for the upper conveyer shaft G. By this means the outer member or hood 8 may be angularly adjusted with respect to the inner member 7 or may be adjusted as necessary due to other adjustments made as aforesaid in the position of this inner member.

In use, then, the deflecting members are adjusted to throw the stream of discharged husks at any angle outwardly or inwardly from the upper end of the elevator A, and to compensate for wind direction or velocity to thereby prevent the husks from falling into the wagon or other undesired place. The adjustment of these deflecting members may also be arranged for remote control from the operator's position on the implement or pulling tractor by any suitable cable arrangement desired. It will be noted that the mounting of these deflector elements will in no way interfere with the adjustments of the trough J.

It is understood that suitable modifications may be made in the structure as disclosed, provided such modifications come within the spirit and scope of the appended claims. Having now therefore fully illustrated and described our invention, what we claim to be new and desire to protect by Letters Patent isc 1. A grain elevator for a harvesting implement comprising, an upwardly inclined housing having a discharge opening in the upper portion of its inclined lower side, means for conveying material upwardly through the housing for discharging the material outwardly and downwardly through the said opening, means for directing a stream of air upwardly and outwardly through the material as it issues through the said discharge opening, a primary deflecting member adjustably mounted on the upper end of the housing and having a channeled portion spaced under the said discharge opening, the said deflecting member also having inner and outer open ends through one of which the air will travel as it blows past the opening, and a secondary deflecting member forming an extension of the said primary deflecting member.

2. A grain elevator for a harvesting implement comprising, an upwardly inclined housing having a discharge opening in the upper portion of its inclined lower side, means for conveying material upwardly through the housing and discharging the material outwardly and downwardly through the said opening, means for directing a stream of air upwardly and outwardly under said opening and through the material as it issues from such opening, a deflecting member of substantially U-shaped cross-section adjustably mounted by its sides upon the upper end portion of the housing and supported with its rounded trough portion disposed generally under the said discharge opening to thereby define an endwise opening channel for the passage of said air stream, and means forming an adjustable extension of the deflecting member.

3. In an elevator for a harvesting implement, an upwardly and outwardly inclined housing having a discharge opening in the upper end portion of its inclined lower side, means within the housing for elevating material from the implement and discharging the material outwardly and downwardly through the opening, a delivery trough supported adjacent a lower margin of the said discharge opening for delivering material as it drops from the opening, means for directing an air blast upwardly and outwardly under the said discharge opening and through the material as it issues therefrom, and a member of substantially U-shaped cross-section adjustably mounted under the housing end portion with a rounded trough portion disposed with one end open for the passage of air outwardly and the lower, inner end being arranged to discharge material upon the said delivery trough.

4. An elevator for a harvesting implement comprising, an upwardly and outwardly inclined housing having a discharge opening in an upper end portion of its lower side, a conveyer mechanism within the housing for elevating material from the implement and discharging the material outwardly and downwardly through the said opening, means for directing an air blast upwardly and outwardly across the said discharge opening to thereby pass through the material as it issues therefrom, a deflecting member adjustably supported on the housing and having a closed portion spaced under the said discharge opening, the inner and outer ends of the said deflecting member being open for the passage of air therethrough, and a second deflecting member adjustably supported adjacent the first mentioned deflecting member and being generally channel shaped for directing the air blast outwardly from the elevator at selected angles.

5. An elevator for a harvesting machine comprising an elongated housing extending upwardly and laterally from the machine, a conveyer operating longitudinally in the housing, said housing having a discharge opening in its under side and at its upper end through which elevated material may fall from the conveyer, a blower mounted on the elevator and having an air discharge nozzle arranged to direct a blast of air longitudinally of the housing and directly under said discharge opening so as to pass through the material discharged therefrom, and a channel shaped deflector supported in inclined position under the upper end of the housing to receive material from said discharge opening while directing the air blast and permitting relatively light materials to pass outwardly therethrough, the lower inner end of the deflector being open to permit the heavier materials to escape downwardly below the air blast.

6. An elevator for a harvesting machine comprising an elongated housing extending upwardly and laterally from the machine and having a discharge opening in its under side and at its upper end through which elevated material may fall, a conveyer operating longitudinally in the housing to elevate material therein, a blower mounted on the elevator and having an air discharge nozzle arranged to direct a blast of air longitudinally of the housing and directly under said discharge opening so as to pass through the material discharged therefrom, an inclined receiving chute disposed below the opening and extending downwardly from a point under the nozzle, a channel shaped deflector arranged outwardly and above the chute and inclined in an opposite direction to the inclination of the chute, and with an open end toward the chute, whereby relatively heavy material dropping from the discharge opening on the deflector will be deflected through said open end to the chute, and said deflector being open at its upper end in substantial alignment with the nozzle whereby said air blast and relatively light materials may be discharged outwardly through said open upper end.

7. An elevator for a harvesting machine comprising an elongated housing extending upwardly and laterally from the machine and having a discharge opening in its under side and at its upper end through which elevated material may fall, a conveyer operating to elevate material longitudinally in the housing, a blower mounted on the elevator and having an air discharge nozzle arranged to direct a blast of air longitudinally of the housing and directly under said discharge opening so as to pass through the material discharged therefrom, an inclined receiving chute disposed below the opening and extending downwardly from a point under the nozzle, a channel shaped deflector arranged outwardly and above the chute and inclined in an opposite direction to the inclination of the chute, and with an open end toward the chute, whereby relatively heavy material dropping from the discharge opening on the deflector will be deflected through said open end to the chute, and said deflector being open at its upper end in substantial alignment with the nozzle whereby said air blast and relatively light materials may be discharged outwardly through said open upper end, and a second deflector adjustably mounted adjacent the air discharge end of the first mentioned deflector.

8. An elevator for a harvesting machine comprising an elongated housing extending upwardly and laterally from the machine and having a discharge opening in its under side and at its upper end through which elevated material may fall, a conveyer operating in the housing to elevate material, a blower mounted on the elevator and having an air discharge nozzle arranged to direct a blast of air longitudinally of the housing and directly under said discharge opening so as to pass through the material discharged therefrom, an inclined receiving chute disposed below the opening and extending downwardly from a point under the nozzle, a channel shaped deflector arranged outwardly and above the chute and inclined in an opposite direction to the inclination of the chute, and with an open end toward the chute, whereby relatively heavy material dropping from the discharge opening on the deflector will be deflected through said open end to the chute, and said deflector being open at its upper end in substantial alignment with the nozzle whereby said air blast and relatively light materials may be discharged outwardly through said open upper end, and means for adjusting the relative angles between said chute and deflector.

9. An elevator for a harvesting machine comprising an elongated housing extending upwardly and laterally from the machine and having a discharge opening in its under side and at its upper end through which elevated material may fall, a conveyer operating to elevate material in the housing, a blower mounted on the elevator and having an air discharge nozzle arranged to direct a blast of air longitudinally of the housing and directly under said discharge opening so as to pass through the material discharged therefrom, and a channel shaped deflector supported in inclined position under the upper end of the housing to receive material from said discharge opening while directing the air blast and permitting relatively light materials to pass outwardly therethrough, the lower inner end of the deflector being open to permit the heavier materials to escape downwardly below the air blast, and means for adjusting the angle of the deflector with respect to the direction of said air blast.

10. An elevator for a harvesting machine comprising an elongated housing extending upwardly and laterally from the machine and having a discharge opening in its under side and at its upper end through which elevated material may fall, a conveyer operating to elevate material in the housing, a blower mounted on the elevator and having an air discharge nozzle arranged to direct a blast of air longitudinally of the housing and directly under said discharge opening so as to pass through the material discharged therefrom, and a channel shaped deflector supported in inclined position under the upper end of the housing to receive material from said discharge opening while directing the air blast and permitting relatively light materials to pass outwardly therethrough, the lower inner end of the deflector being open to permit the heavier materials to escape downwardly below the air blast, said deflector being pivotally attached to the housing for movement about an axis transverse to the length of the housing, and means for adjustably securing the deflector in selected positions to vary the deflecting angle of the deflector with respect to said air blast.

GUSTAV ANDERSON.
ORVILLE J. PARKS.
KENNETH M. KEITH.